United States Patent Office 2,734,302
Patented Feb. 14, 1956

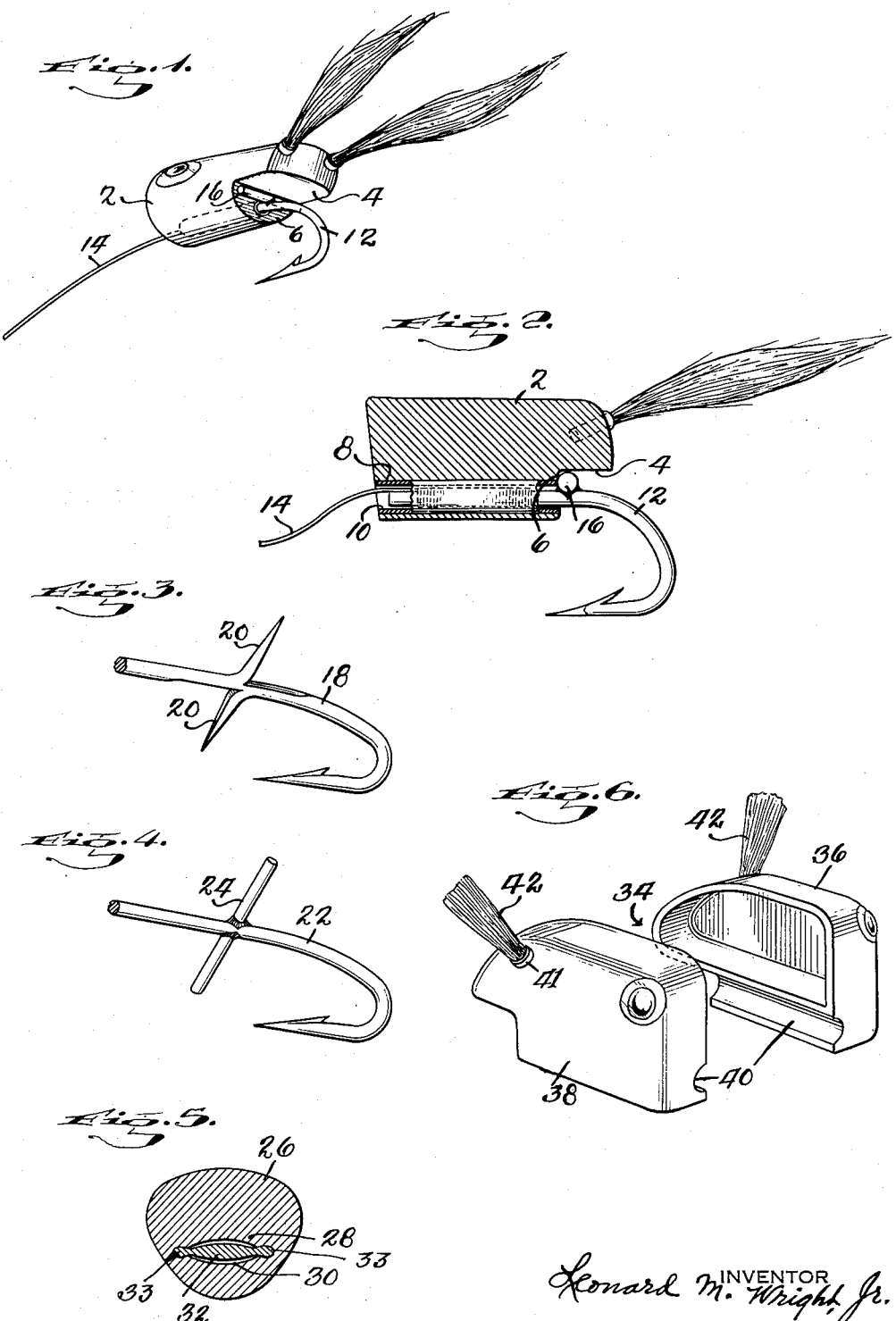

2,734,302

FISHING LURE OF THE FLOATING TYPE

Leonard M. Wright, Jr., New York, N. Y.

Application February 1, 1954, Serial No. 407,479

1 Claim. (Cl. 43—42.05)

This invention relates to an improvement in fishing lures and has particular reference to hard-bodied lures of the floating type and referred to hereinafter as "bugs" used for fishing fresh-water game fish, such as bass, that consistently jump when hooked.

One of the unsatisfactory features of these bugs as heretofore constructed is the frequency with which the bass detaches itself from the bug, conventionally referred to as "throwing" the lure. One of the objects of my invention is to provide a bug of such construction that this difficulty is largely reduced, inasmuch as I have found from actual experience that my bug will hold anywhere from 20% to 30% more bass than when fishing with the conventional bug.

From my observations in actual practice, the frequency with which the bug is detached from the fish or "thrown" is due in a large measure to the location of the hook relative to the bug body and to the fact that conventionally the lure body and hook are rigidly secured to each other. Prior to my invention, it has been customary for the point and barb of the hook to be an appreciable distance behind the rear end of the bug body, and, inasmuch as the bug body and hook are rigidly secured to each other, it is quite obvious that the bass has considerable available leverage to aid him in "throwing" the bug.

In the present construction I provide that the body of the bug shall leave the hook when a fish is hooked, and, in addition, I provide that the point and barb of the hook shall normally underlie the bug body well forward of the rear end of the bug, so as very materially to reduce the leverage which otherwise would be available to aid the fish in "throwing" the bug.

I am aware that, prior to my invention, attempts have been made to construct lures of various types in such a fashion that the lure and hook will become separated from each other when a fish is hooked, but such constructions are not suitable for bugs of the floating type, due to the construction employed by the makers to hold the lure and hook together prior to actually hooking a fish. In some cases spring clamps are employed as well as various other friction devices, all of which add to the weight of the lure and prohibit their use on bugs. My invention provides a construction in which neither clamps nor friction are relied upon to maintain the bug body and hook in fishing position relative to each other prior to a strike.

Generally speaking, the body of my improved bug, which may be of wood or plastic or other hard, light material, is indented at its underside and toward the rear end of the bug, to provide a stop shoulder in the underside of the bug body. The body of the bug is bored longitudinally, the bore which passes through this shoulder extending forwardly through the head of the bug. The shank of the hook extends into this bore with a loose fit and, just in front of the bend of the hook, is provided with means which contacts the stop shoulder. This prevents rearward movement of the bug body on the hook shank when casting and retrieving the bug; and in one embodiment of my invention this stop means also cooperates with that portion of the bug body to the rear of the stop shoulder, to prevent relative rotation between the hook shank and the bug body, so that the point and barb of the hook will always be in proper position relative to the bug body. However, because the hook shank is a loose fit in the body bore, the bug body is free to move forwardly along the hook shank and beyond when a fish is hooked, so that the only weight then available to aid the fish in his efforts to throw the hook is the weight of the hook itself, as distinguished from the hook plus the bug body.

I have made reference to the proper positioning of the point and barb of the hook with respect to the body of the bug, and in this connection it should be noted that my construction ensures that the hook point shall lie well forward of the rear end of the hard body of the bug. From my experience, this is the ideal location. It is customary in lures of the bug type to imbed the hook in the body of the bug, and the shank of the hook is sufficiently long for the eye of the hook to protrude to and through the head end of the lure. Because of the necessarily long hook shank, the bend of the hook, which is immediately above the point, will lie beyond the rear end of the bug. Because of this construction, many strikes are missed. The fish is striking at the body of the bug and not at the hook, and if the point of the hook is to the rear of the bug body, it will be quite obvious that many strikes will be missed. In my improved construction I provide for the point and barb of the hook to lie substantially below the middle of the bug body, so that, in striking the bug body, a fish is almost sure to be hooked.

My improved construction provides another advantage in that, because of the greater clearance available between the hook point and the body of the bug, I may employ smaller hooks than would otherwise be suitable.

In the accompanying drawings,

Fig. 1 is a view in perspective of a fishing bug embodying my invention;

Fig. 2 is a longitudinal section through Fig. 1;

Figs. 3 and 4 are perspective views of hooks adapted for use with my improved bug;

Fig. 5 is a part-sectional view of another embodiment of the invention; and

Fig. 6 is an exploded view of a modified bug body.

Referring to the drawings in detail and, first of all, to Figs. 1 and 2:

2 designates the body of a bass bug of the floating type, this body being made of wood, plastic, or other similar material. The underside or underportion of the body 2 is provided with an indentation forming a flat 4, which extends from the rear end of the bug forwardly longitudinally of the bug for a substantial distance, the remainder of the indentation extending outwardly to the surface of the bottom portion of the bug, forming a shoulder 6 of appreciable depth, which terminates at the surface of the bug bottom. That portion of the bug body lying forwardly of the shoulder 6 is provided with a longitudinally extending bore 8, into which I prefer to fit a tube 10, although it is to be understood that the tube 10 may be dispensed with, if desired. The bore 8 and tube 10, when one is used, extend from the shoulder 6 lengthwise of the bug to and through the front or head end of the bug.

12 designates a fish hook, constituting part of my improved bug, which, instead of being eyed, is equipped with a snell 14, and the shank of this hook extends into the tube 10 or directly into the bore 8. The shank of the hook 12, just in front of the bend of the hook, is provided with crossbar element 16 projecting from the sides of the hook shank for a substantial distance, as appears from Fig. 1. This element has two functions: it cooperates with the shoulder 6 to limit the movement of the hook shank into the bore 8, and it also cooperates with the flat 4 to prevent relative rotation of the hook and bug body. The element 16 of Figs. 1 and 2 may be a piece of stiff wire or other suitable material simply tied to the hook shank.

In Fig. 3 I have illustrated a construction in which the shank of the hook, designated 18, is sliced at opposite sides and the metal of the shank bent outwardly, as seen at 20, at each side of the shank, to provide an integral construction, which, so far as operation is concerned, is comparable to the element 16 of Figs. 1 and 2.

In Fig. 4 I show the shank of the hook 22 provided with a short length of wire, designated 24, which is disposed so that it lies transversely of the hook shank, this wire being welded to the shank.

It will be seen from the drawings that the elements 16, 20, and 24 are always positioned a short distance in front of the bend in the hook, where the strain on the hook is a minimum.

It is to be noted also that the flat area 4, provided by indenting the bug body, extends forwardly of the bug body sufficiently far to bring the point of the hook substantially midway of the bug body. This is of material advantage in that many more fish are hooked with this construction than with conventional bugs, where, by reason of the construction employed, the point of the hook is some distance behind the lure. It is my theory that a fish strikes at the body of the bug, and if the point of the hook is, say for example, about midway the length of the bug, then it is quite apparent that the fish is more likely to be hooked than where the hook is to the rear of the bug.

In Fig. 5 I have shown a construction in which the body 26 of the bug, which corresponds to the body 2 of Fig. 1, for example, is provided with a bore 30 extending from shoulder 28, which corresponds to shoulder 6 of Fig. 1, to and through the head of the bug. This bore is oval in cross-section. The shank 32 of the hook is slightly flattened also, which prevents relative rotation of the bug body and hook shank. To limit rearward movement of the bug body along the hook shank, the wire of the hook shank may be provided with lateral bosses 33, which engage the shoulder 28 in much the same fashion at the crossbar 16 of Fig. 1 engages the shoulder 6 of the lure body.

In the construction illustrated in Fig. 6 I show a bug body 34, which may be of the same general shape as the bug of Fig. 1 or other shape as desired, this body being of plastic and composed of two halves, each of which is hollow and so shaped that, when the two halves are sealed together, they will provide a bore corresponding to the bore 8 of Figs. 1 and 2. The two halves of the bug of Fig. 6 are designated 36 and 38. These portions are grooved, as shown at 40, so that, when the two halves are sealed together, a bore corresponding to the bore 8 of Figs. 1 and 2 will be provided. The upper portion of the body sections 36 and 38 are hollow, as will appear from the drawing, so that an air chamber will be formed in the bug body to provide a very buoyant construction. In molding the bug body sections 36 and 38, I form depressions in their surfaces, each preferably surrounded by an external ridge or collar 41. The end of the hair or feathers 42 of the bug may be dipped in a suitable adhesive, and simply inserted in these indentations.

From all of the foregoing it will be apparent that my invention provides a fishing lure in the nature of a floating bug wherein the hook is free to move away from the bug body when a fish strikes, the two elements, namely, the body and hook, normally remaining in proper relation to each other without the use of clamps or other friction devices.

It will be seen also that my invention provides another advance in the field of fishing lures inasmuch as, by reason of the simple construction employed, it becomes a simple matter to withdraw the hook and snell from one body and insert it in another, thereby enabling an angler to use an innumerable variety of bug bodies without the necessity of requiring him to have a separate hook for each body.

As above pointed out, by properly positioning the stop element along the hook shank, the point of the hook will lie well forward of the rear end of the bug body, which is a decided advantage over existing lures of the floating bug type wherein the hook shank is embedded in the bug body, and the point of the hook is a substantial distance to the rear of the bug body.

It is to be understood that changes may be made in the details of construction and arrangement of parts above described within the purview of my invention.

What I claim is:

A fishing lure of the floating type comprising, in combination, a lure body and a hook, the body being provided on its under portion with an indentation shaped to provide a flat extending forwardly of the lure body from the rear end thereof, said flat terminating intermediate the ends of the body, the material of the body at the termination of said flat extending outwardly of the under portion of the body to the surface of the same to provide a shoulder in the lure body, said lure body having a bore extending lengthwise thereof from said shoulder to the head end of the body, said bore receiving the hook shank with a sufficiently loose fit to enable the body to be moved forwardly of the hook shank until completely free of the same; and a crossbar carried by the hook shank forwardly of the bend of the hook, said bar cooperating with said shoulder to limit rearward movement of the lure body along the hook shank and with said flat to prevent relative rotation between the lure body and hook shank.

References Cited in the file of this patent

UNITED STATES PATENTS

| 1,434,204 | Grounsell | Oct. 31, 1922 |
| 2,008,437 | DeWitt | July 16, 1935 |
| 2,112,901 | Anderson | Apr. 5, 1938 |
| 2,579,338 | Gambill | Oct. 9, 1951 |
| 2,596,201 | Bocchino | May 13, 1952 |

FOREIGN PATENTS

| 897 | Great Britain | 1899 |
| 770,699 | France | July 2, 1934 |